United States Patent [19]

Smith et al.

[11] Patent Number: 5,044,709

[45] Date of Patent: Sep. 3, 1991

[54] LED ARRAY POLARIZED IMAGE SOURCE/0 DEGREE HOLOGRAM VIRTUAL IMAGE HEAD UP DISPLAY

[75] Inventors: Ronald T. Smith, Redondo Beach; Mark McDonald, Culver City, both of Calif.

[73] Assignee: Hughes Aircraft Company, Los Angeles, Calif.

[21] Appl. No.: 278,083

[22] Filed: Nov. 30, 1988

[51] Int. Cl.$^5$ ............................................. G02B 5/32
[52] U.S. Cl. ...................................... 359/13; 359/630
[58] Field of Search .................... 350/3.7, 174, 162.2, 350/3.65, 172

[56] References Cited

U.S. PATENT DOCUMENTS

| | | | |
|---|---|---|---|
| 3,915,548 | 10/1975 | Opittek et al. | 350/3.72 |
| 4,372,639 | 2/1983 | Johnson | 350/3.7 |
| 4,412,719 | 11/1983 | Fineup | 350/3.7 |
| 4,722,601 | 2/1988 | McFarlane | 356/152 |
| 4,761,056 | 8/1988 | Evans et al. | 350/174 |
| 4,789,977 | 12/1988 | Ouderhuysen et al. | 350/3.72 |
| 4,790,613 | 12/1988 | Moss | 350/3.7 |
| 4,795,223 | 1/1989 | Moss | 350/3.85 |
| 4,815,800 | 3/1989 | Chern et al. | 350/3.7 |
| 4,832,427 | 5/1989 | Smith et al. | 350/3.72 |
| 4,958,892 | 9/1990 | Jannson et al. | 350/3.6 |

OTHER PUBLICATIONS

"*Optical Holography*", Collier et al, Academic Press, 1971, pp. 19–22.

Primary Examiner—Bruce Y. Arnold
Assistant Examiner—J. P. Ryan
Attorney, Agent, or Firm—Leonard A. Alkov; Wanda K. Denson-Low

[57] ABSTRACT

A holographic display system having a dynamic image source including selectively activated light emitting diodes for providing spectrally narrowband and narrow beam imaging illumination through an apertured mask, and further having a mirror reflection hologram for reflecting the image to provide an observable virtual image. The image source further includes a polarizer and an optional diffuser.

9 Claims, 2 Drawing Sheets

LED ARRAY POLARIZED IMAGE SOURCE/0 DEGREE HOLOGRAM VIRTUAL IMAGE HEAD UP DISPLAY

BACKGROUND OF THE INVENTION

The disclosed invention is directed generally to a head-up holographic virtual image display, and is more particularly directed to a dynamic holographic virtual image instrument display for a vehicle.

Head-up holographic instrument displays for vehicles, which provide virtual images that appear to be located ahead of the vehicle windshield toward the front of the vehicle, provide the advantages of increased safety since the operator does not have to significantly divert attention from viewing the outside, and are more readily noticed in the event of the display warning of a malfunction.

Known head-up displays include "static" displays wherein predetermined message holograms (e.g., "low fuel") in a vehicle windshield are selectively illuminated by appropriate light sources. The obvious problem with such static displays is their inability to indicate changing parameters such as vehicle speed or engine speed.

Known head-up displays also include "dynamic" displays wherein the visible image is changeable. An example is the use of individual hologram segments in a vehicle windshield which are selectively illuminated by respective beams to control the visibility of the individual segments to display changing numerical information, for example. However, the use of hologram segments provides low image resolution, and is subject to ambient scatter and ambient turn-on (i.e., the unintended "turn-on" of the hologram image caused by an ambient light source). Ambient turn-on is a particularly important consideration since erroneous readings will occur, which could be potentially dangerous depending on the displayed information. Further, since the illuminating light sources would have to be carefully aligned and maintained in alignment, this dynamic display is complex, expensive, and subject to potential reliability problems.

SUMMARY OF THE INVENTION

It would therefore be an advantage to provide a head-up holographic display for a vehicle which provides for a dynamically changing, bright, sharp virtual image.

Another advantage would be to provide a head-up holographic display for a vehicle which provides a dynamically changing, bright, sharp virtual image and is reliable and not complex.

A further advantage would be to provide a head-up holographic display for a vehicle which provides a dynamically changing, bright, sharp virtual image and which does not require complex alignment.

The foregoing and other advantages are provided in a head-up dynamic holographic display system which includes an image source having selectively activated light emitting diodes, and a mirror reflection hologram for reflecting the image to provide an observable virtual image.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
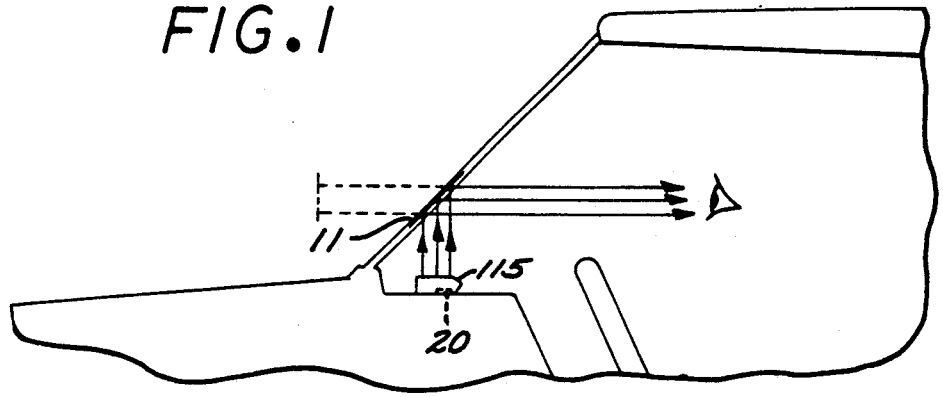
FIG. 1 is a schematic illustration of the major components of the disclosed head-up holographic display system.

In the following detailed description and in the several figures of the drawing, like elements are identified with like reference numerals.

Referring now to FIG. 1, shown therein is a head-up dynamic holographic display system that includes a dynamic image source 20 and a mirror reflection hologram 11. By way of example, the holographic display system can be installed in an automobile as illustrated in FIG. 1. The image source 20 would be on the dashboard or in a recess in the dashboard, while the mirror reflection hologram 11 would be laminated between the inside and outside glass layers of the windshield.

Figure 2:
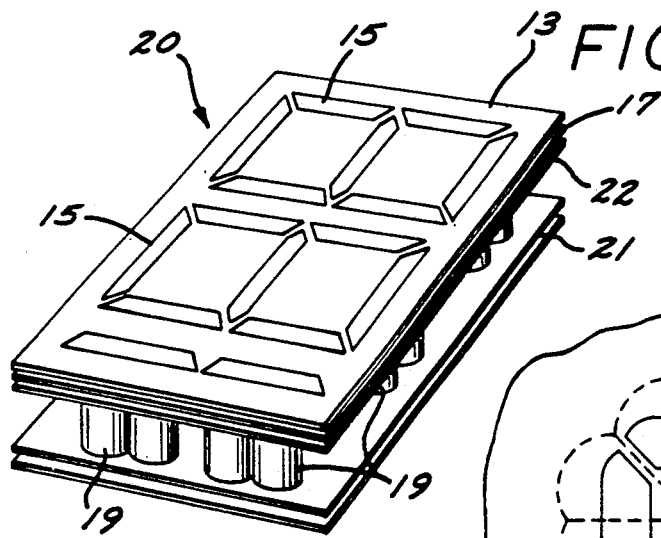
FIG. 2 is a schematic exploded view of the image source of the holographic display system of FIG. 1.

Referring now to FIG. 2, shown therein is an exploded view of the dynamic image source 20 which includes an apertured mask 13 having openings that define the symbols or characters that are to be displayed. By way of specific example, the mask 13 is shown as having segment shaped openings 15 which can define three digits utilized to indicate vehicle speed (i.e., a digital speedometer).

The image source 20 further includes a polarizer 17 beneath the mask 13 for providing P-polarization of the illumination provided by LEDs 19 which are below the polarizer 17 and provide dynamically changing illumination when selectively activated. The LEDs 19 are supported by a circuit board 21, for example, which includes appropriate drive circuitry (not shown) for the LEDs 19.

Figure 3:
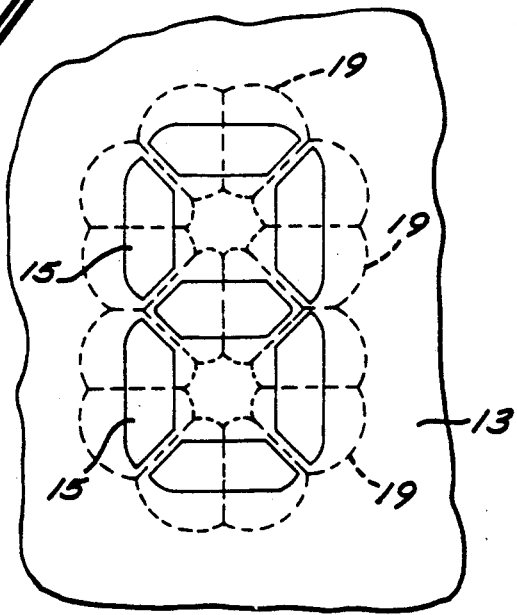
FIG. 3 is detail view showing the configuration of the LED light sources of the image source of FIG. 2.

As shown schematically in FIG. 3, the LEDs 19 are arranged to illuminate the openings 15 in the mask 13. The lenses of LEDs 19 are shaped so that LEDs for a given segmented opening 15 can be located close to each other to provide the appearance of being a continuous source of light. For example, two closely fitted LEDs are provided for each of the segmented openings 15. The shaping of the LED lenses can be achieved by custom manufacture or by appropriately cutting the lenses of commercially available LEDs. Selective activation of the LEDs, for example to indicate vehicle speed, provides a dynamic image to the mirror reflection hologram 11.

The LEDs 19 advantageously provide narrow cones of narrow spectral bandwidth illumination, preferably less than about 50 nanometers, without filtering and the attendant attenuation. Since the illumination is spectrally narrowband, the reflection mirror hologram 11 can also be narrowband since its bandwidth needs to be only as wide as that of the pertinent illumination. With a narrowband reflection mirror hologram, light from outside the vehicle is not significantly reflected, and substantial background darkening and tinting (which would occur with a wideband image source and a wideband hologram) are avoided.

Figure 4:
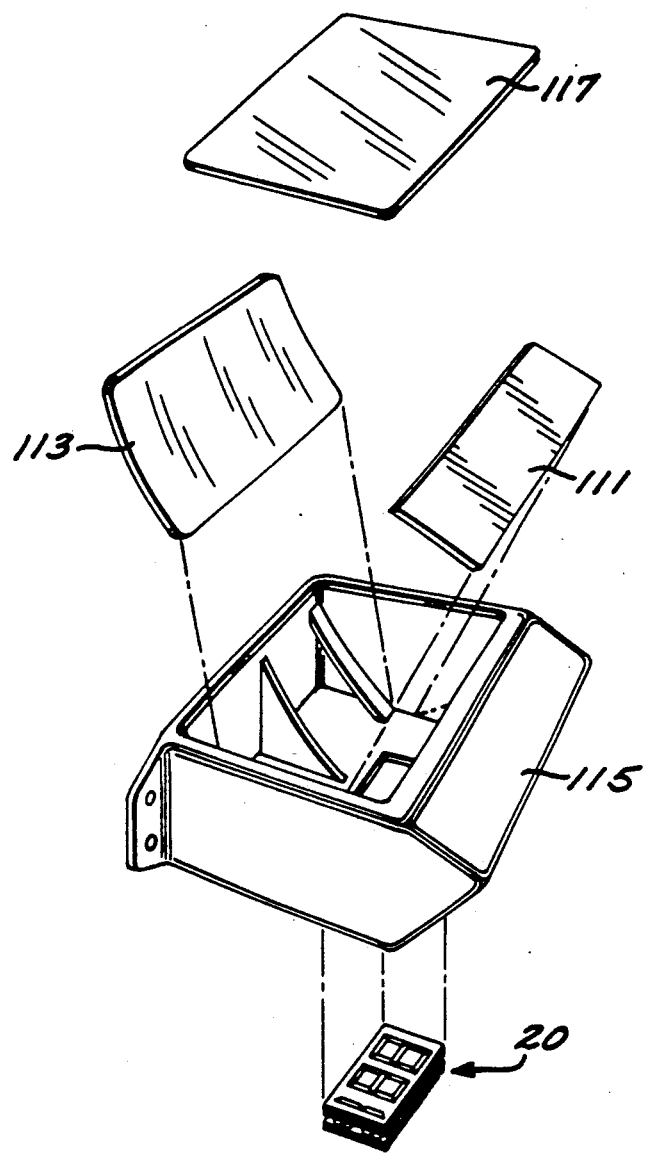
FIG. 4 is a schematic exploded view of an optical system that can be used with the disclosed head-up holographic display system for controlling the size and location of the virtual image.

For efficiency and image brightness, the illumination cone provided by each of the LEDs is preferably sufficiently narrow to be substantially confined within an appropriately sized eyebox region at the viewing optical distance. As illustrated in FIG. 4, discussed further herein, appropriate spherical or aspherical optical elements can be utilized to shape the beams provided by the LEDs 19, to control the size of the virtual image, to control the location of the virtual image relative to the driver, and/or to substantially confine the illumination within an appropriately sized eyebox region.

The illumination provided by the LEDs 19 should be sufficiently bright to provide clear visibility under the expected brightest conditions, for example bright sunlight. The illumination cone, bandwidth, and brightness characteristics can be provided by custom manufacture of the LEDs 19 or by appropriate selection of commercially available LEDs.

By way of specific example, the commercially available Stanley H-3000 LED could be utilized. This LED provides light over about a 9.7 degree full-width angular circular cone, and has a spectral bandwidth of 25 nanometers (nm). The 9.7 degree cone of light advantageously produces an eyebox having a diameter of about 6 inches when viewed at a typical optical distance of about 36 inches.

The Stanley H-1000 has similar illumination cone and spectral characteristics, but provides less illumination for any given voltage and costs less. In some applications, the reduced illumination may be satisfactory since the necessary brightness is dictated by visibility in bright sunlight.

A high gain diffuser 22 can optionally be located between the LEDs 19 and the polarizer 17 to broaden the eyebox if necessary and/or to improve image uniformity. Possible high gain screens include Polacoat 15 gain screens marketed by the Da-Lite Screen Company (Cincinnati, Ohio), high gain lenticular screens marketed by Protolite (Palo Alto, Calif.), finely ground glass, frosty Scotch brand tape, or an electrically controlled variable scatter liquid crystal layer. Use of two spatially separated high gain screens yields further improvement in image uniformity.

For further image enhancement of an image source 20 that includes a diffuser 22, light control film marketed by the 3M Company can be located between the mask 13 and the polarizer 17, which allows only light within a narrow angular range to pass through, and helps prevent ambient light from reflecting off the diffuser.

Preferably, to avoid potentially dazzling reflections, the image source 20 is configured so that the front portion comprising the mask 13, the polarizer 17, and the diffuser 22 is tilted so that it is not normal to emanating light. Specifically as viewed in FIG. 1, the front face of the image source 20 would be tilted clockwise; i.e., with the forward edge tilted upward. By way of specific example, if the LEDs are aligned to provide illumination in the vertical direction, the front face of the image source 20 would be tilted to be non-horizontal. The top of the resulting virtual image would appear to be tilted away from the driver.

The reflection hologram 11 is a high diffraction efficiency, non-slanted fringe (0 degree), narrowband reflection mirror hologram tuned to be reflective over the appropriate spectral bandwidth and incident angle of the image source 20. For example, for the previously identified H-3000 LED, the hologram would be tuned to be reflective over a nominal full width spectral bandwidth of 25 nanometers centered at 660 nanometers for light incident at a particular off-axis angle (i.e., at some angle relative to normal). The fringes of the hologram are unslanted with respect to the surface for the following reasons. Blurring of the image due to chromatic dispersion is avoided as is the problem of hologram flare, which is the transmissive diffraction inherent in all slant-fringe holograms that produces objectionable rainbows in the field of view from light sources such as on-coming headlights.

While the non-slanted fringe hologram avoids certain problems discussed above, it introduces the problem of a double ghost image that results from the reflections off the outside and inside glass/air interfaces being in the same direction as the hologram reflection. The P-polarizer 17, which provides polarization parallel to the plane of incidence, reduces the ghost imaging. This results from the fact that although the reflection at a glass/air interface at high incident angles such as 67 degrees is high for S-polarized light, it is very low for P-polarized light, dropping to zero percent at the Brewster angle, which is about 56° incident angle for a glass/air interface.

There are, however, transmittance considerations with tuning the bandwidth of the hologram 11 to the bandwidth of the P-polarized illumination. The hologram peak efficiency and spectral bandwidth at high incident angles such as 67° is much less for P-polarized light than for S-polarized light. For example, with dichromated gelatin volume holograms, a bandwidth of 30 nanometers and 95 percent peak efficiency at 660 nanometers and 67° incident angle can be achieved for P-polarized light. For S-polarized light the corresponding spectral bandwidth would be about 70 nanometers. While this results in some see-through discoloration, it would not be objectionable since the peak wavelength is deep in the red portion of the visible spectrum. With that efficiency and bandwidth, most of the LED light having the characteristics of the Stanley LEDs discussed above will be reflected. Of the small amount that leaks through, only 2-3 percent will get reflected off the outside glass/air interface toward the viewer and of this amount, 95 percent will be reflected by the hologram. Therefore, if the hologram is efficient and of sufficient bandwidth, the ghost image from the outside glass/air interface will be substantially eliminated. The ghost image from the inside glass/air interface should only be about 2-3 percent the brightness of the hologram reflection.

In use, the viewer operator will probably reduce the main image brightness down to be about 50 percent as bright as the background ambient brightness. In that case, the ghost image from the front glass/air interface would only be 1 percent of the ambient brightness, which will render it unobjectionable and probably unnoticeable. Further, since one layer of a windshield is only typically 70-90 mils thick, the ghost image will be only slightly displaced relative to the primary image, which reduces the noticeability of the ghost image.

The foregoing described hologram 11 includes characteristics which allow it to be advantageously utilized in automobiles. With peak reflectance at a wavelength of 660 nm at a 67 degree incident angle, the peak reflectance at normal is at a wavelength of 803 nm, which will pass present federal transmittance requirements. Since the hologram is mounted within the windshield, the federal windshield abrasion requirements are met. Glare reflecting off the windshield does not present a problem, since the hologram has a high peak wavelength, is narrowband, and is a small patch only that does not cover the entire windshield. As a result of mounting the hologram within the windshield, see-through distortion is minimal and the hologram edges are not readily noticeable. Also, the hologram 11 is immune to ambient turn-on and ambient scatter which occur with image holograms. Further, under severe viewing conditions when road glare is present, the display is highly viewable. Road glare is predominately S-polarized, and polarized sunglasses are typically designed to block S-polarized light. Therefore, the P-polarized light from the display passed through polarized sunglasses unimpeded, with improved image to background contrast.

As mentioned previously, appropriate spherical or aspherical optical elements (e.g., lenses or mirrors) could be used to shape the beams provided by the LEDs, to control image size, and/or to control location of the virtual image relative to the driver. Referring now to FIG. 4, shown therein is an optical assembly which would provide a virtual image located further ahead of the windshield (i.e., further away from the driver). The optical assembly includes a housing 115 to which the image source 20 is secured. A fold mirror 111 secured in the housing reflects the illumination from the image source to a spherical mirror 113, also secured in the housing 115, which in turn relays the illumination through a transparent cover 117 to the reflection mirror hologram within the windshield.

It should be appreciated that presently known head-up displays that utilize spectrally broad vacuum-fluorescent tubes as image sources can be readily modified to utilize the reflection mirror hologram and the narrowband, narrow beam LED image source described above.

The foregoing has been a disclosure of a head-up holographic display for vehicles such as automobiles which provides advantages including a dynamically changing, bright, uniform, sharp, flare-free virtual image behind a windshield with high photopic see-through, immunity to ambient turn-on and scatter, minimal see-through discoloration, minimal ghosting, minimal see-through distortion, minimal dashboard glare, minimal hologram edge visibility, and compatibility with polarized sunglasses. Further, the components of the display system permit efficient production at low cost. The use of small, efficient and low cost LEDs provides for a compact, low cost, energy efficient, narrow beam image source which does not utilize filtering to achieve a narrow bandwidth of less than about 50 nm. The zero degree hologram is amenable to low cost production such as laser scanning, and no critical alignment is required.

Although the foregoing has been a description and illustration of specific embodiments of the invention, various modifications and changes thereto can be made by persons skilled in the art without departing from the scope and spirit of the invention as defined by the following claims.

What is claimed is:

1. A virtual image display system comprising:
   means for providing a dynamically changing image comprising means for providing beams of light having a narrow spectral bandwidth of less than about 50 nanometers, wherein said means for providing light beams includes light emitting diodes and a mask having openings for selectively masking the illumination provided by said light emitting diodes; and
   a reflection hologram having fringe planes equidistant to the hologram surface for reflecting the image to produce an observable virtual image.

2. The virtual image display system of claim 1 wherein said means for providing light beams further includes a polarizer.

3. The virtual image display system of claim 1 wherein said means for providing light beams further includes a diffuser.

4. The virtual image display system of claim 1 wherein said mirror reflection hologram having fringe planes equidistant to the hologram surface is tuned to the spectral bandwidth of said image providing means.

5. The virtual image display system of claim 1 wherein said reflection hologram having fringe planes equidistant to the hologram surface is tuned to the P-polarization spectral bandwidth of said image providing means.

6. A virtual image display system comprising:
   means for providing dynamically changing illumination having a narrow spectral bandwidth of less than about 50 nanometers wherein illumination providing means includes light emitting diodes and a mask having openings for selectively masking the illumination provided by said light emitting diodes; and
   a non-slanted mirror refection hologram having fringe planes equidistant to the hologram surface tuned to be reflective over the spectral bandwidth of said illumination providing means for reflecting said narrowband illumination to produce an observable virtual image.

7. The virtual image display system of claim 6 wherein said illumination providing means includes a polarizer.

8. The virtual image display system of claim 7 wherein said illumination providing means includes a diffuser.

9. A virtual image display system comprising:
   means for providing dynamically changing illumination having a narrow spectral bandwidth of less than about 50 nanometers wherein said illumination providing means includes light emitting diodes and optical elements for selectively masking the illumination provided by said light emitting diodes; and
   a mirror reflection hologram having fringe planes equidistant to the hologram surface tuned to be reflective over the spectral bandwidth of said illumination providing means for reflecting said narrowband illumination to produce an observable virtual image;
   said narrowband illumination being substantially confined to an eyebox spatial region.

* * * * *